(12) United States Patent
Pilkington

(10) Patent No.: US 8,858,125 B2
(45) Date of Patent: Oct. 14, 2014

(54) TOOL ASSEMBLY FOR REMOVING MATERIAL FROM A WORK-PIECE

(75) Inventor: Mark Iain Pilkington, Camby, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1353 days.

(21) Appl. No.: 12/041,904

(22) Filed: Mar. 4, 2008

(65) Prior Publication Data

US 2009/0226268 A1 Sep. 10, 2009

(51) Int. Cl.
- B23B 51/06 (2006.01)
- B23B 27/10 (2006.01)
- B23Q 11/10 (2006.01)
- B23C 5/28 (2006.01)

(52) U.S. Cl.
CPC .......................................... *B23C 5/28* (2013.01)
USPC ................................ 407/11; 408/57; 409/136

(58) Field of Classification Search
USPC ........... 407/11, 34; 408/56–61; 409/135, 136, 409/231, 232, 233, 234
See application file for complete search history.

(56) References Cited

U.S. PATENT DOCUMENTS

| | | | |
|---|---|---|---|
| 1,746,716 A * | 2/1930 | Sasse | 408/59 |
| 2,807,443 A * | 9/1957 | Wyman | 175/404 |
| 4,168,925 A * | 9/1979 | Dufresne | 408/59 |
| 4,322,189 A * | 3/1982 | Briese | 409/136 |
| 4,576,527 A | 3/1986 | Haug | |
| 4,673,317 A | 6/1987 | Haug | |
| 4,795,292 A * | 1/1989 | Dye | 409/136 |
| 4,921,376 A * | 5/1990 | Tani et al. | 409/131 |
| 5,028,178 A * | 7/1991 | Ronen | 409/136 |
| 5,062,742 A | 11/1991 | Haug | |
| 5,098,231 A | 3/1992 | Haug | |
| 5,238,335 A * | 8/1993 | Nomura | 408/59 |
| 5,690,137 A * | 11/1997 | Yamada | 137/240 |
| 5,873,684 A | 2/1999 | Flolo | |
| 6,241,125 B1 * | 6/2001 | Jacobsen et al. | 222/145.4 |
| 6,524,034 B2 * | 2/2003 | Eng et al. | 408/59 |
| 6,902,355 B2 | 6/2005 | Kress et al. | |
| 7,004,692 B2 | 2/2006 | Hecht | |
| 7,073,988 B2 * | 7/2006 | Giessler | 408/59 |
| 7,125,205 B2 * | 10/2006 | Sheffler | 407/11 |
| 2003/0002936 A1 * | 1/2003 | Camozzi | 408/59 |
| 2007/0196188 A1 | 8/2007 | Hecht et al. | |
| 2008/0175676 A1 * | 7/2008 | Prichard et al. | 407/11 |
| 2008/0175677 A1 * | 7/2008 | Prichard et al. | 407/11 |
| 2008/0175679 A1 * | 7/2008 | Prichard et al. | 407/42 |
| 2009/0142150 A1 * | 6/2009 | Chu | 408/59 |

\* cited by examiner

*Primary Examiner* — Kenneth E. Peterson
*Assistant Examiner* — Jennifer Swinney
(74) *Attorney, Agent, or Firm* — Krieg DeVault LLP

(57) ABSTRACT

A tool assembly for removing material from a work-piece is disclosed herein. The tool assembly includes a cutter having a plurality of cutting teeth spaced circumferentially about an axis of rotation along a cutting end periphery. The cutter also includes a body extending away from the cutting end periphery along the axis of rotation. The tool assembly also includes a passageway for directing a flow of coolant to the cutting end periphery. The passageway is defined at least in a part by the cutter. The tool assembly also includes a cap engaged with the cutter. The cap includes a dispersion disk positioned in spaced relation to the cutting end periphery whereby an annular gap is defined between the cutting end periphery and the dispersion disk along the axis of rotation. The gap communicates with the passageway for directing coolant radially outward to all of the cutting end periphery.

15 Claims, 3 Drawing Sheets

TOOL ASSEMBLY FOR REMOVING MATERIAL FROM A WORK-PIECE

BACKGROUND OF THE INVENTION

1. Field of the Invention

The subject invention relates to a tool assembly for removing material from a work-piece and more specifically to a tool assembly having structure for directing a flow of fluid to a cutting edge to remove chips from the work-piece and cool the cutting edge.

2. Description of the Prior Art

It is desirable to control the flow and direction of a fluid, such as air or coolant or lubricant, over a cutting edge of a material-removing tool such as a cutter. These fluids can increase the work life of the cutting edge. The flow of fluid to the cutting edge can be directed by hoses that are external to the tool and are aimed at the cutting edge. Alternatively, the flow of fluid to the cutting edge can be directed by an internal passageway defined by the tool itself.

SUMMARY OF THE INVENTION

In summary, the invention is a tool assembly for removing material from a work-piece. The tool assembly includes a cutter having a plurality of cutting teeth spaced circumferentially about an axis of rotation along a cutting end periphery. The cutter also includes a body extending away from the cutting end periphery along the axis of rotation. The tool assembly also includes a passageway for directing a flow of coolant to the cutting end periphery. The passageway is defined at least in a part by the cutter. The tool assembly also includes a cap engaged with the cutter. The cap includes a dispersion disk positioned in spaced relation to the cutting end periphery whereby an annular gap is defined between the cutting end periphery and the dispersion disk along the axis of rotation. The gap communicates with the passageway for directing coolant radially outward to all of the cutting end periphery.

BRIEF DESCRIPTION OF THE DRAWINGS

Advantages of the present invention will be readily appreciated as the exemplary embodiment is considered in view of the accompanying drawings, wherein.

DETAILED DESCRIPTION OF THE EXEMPLARY EMBODIMENT

Figure 1:
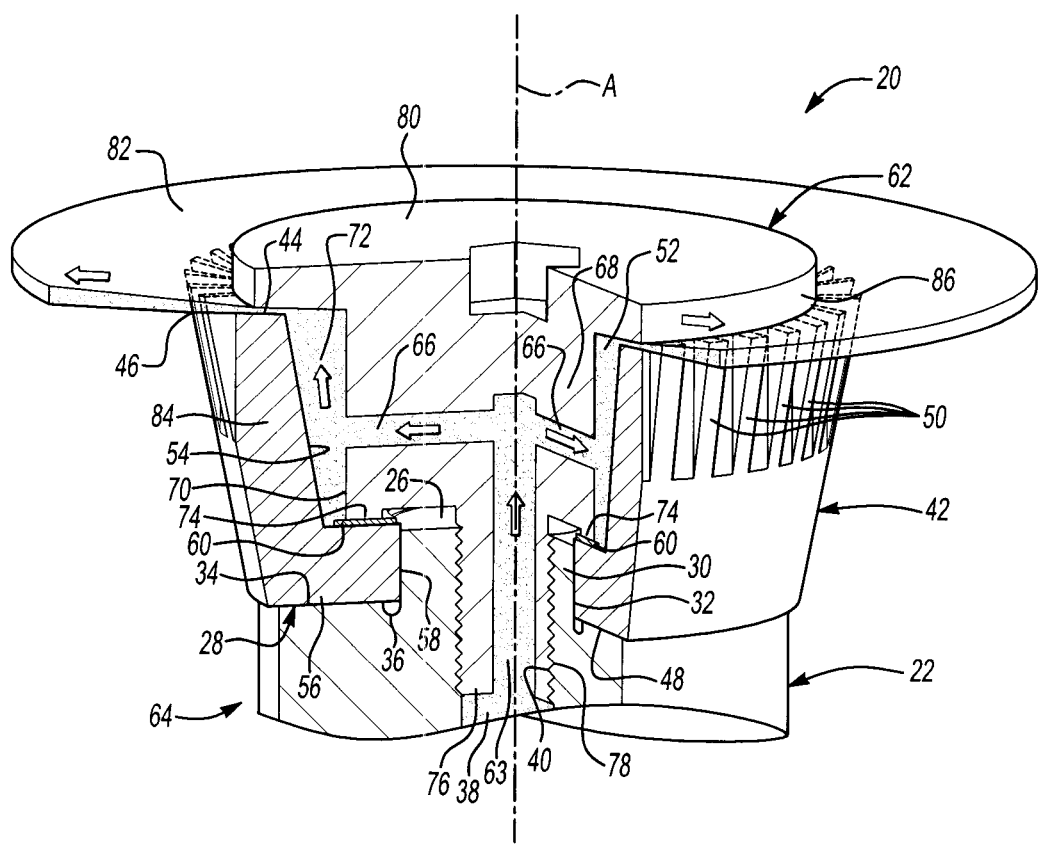
FIG. 1 is a perspective view of a first exemplary embodiment of the invention with a portion cut-away.
Figure 2:
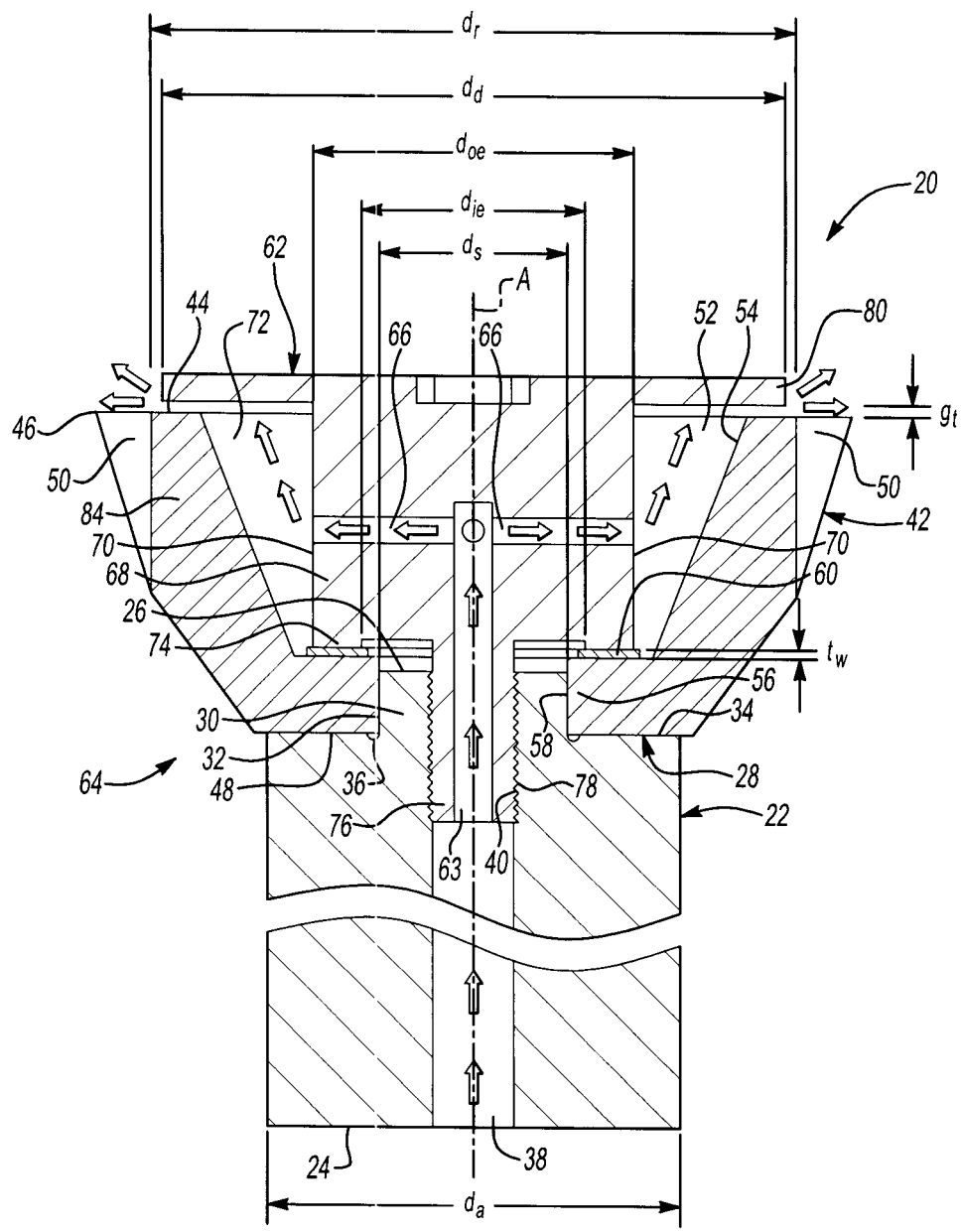
FIG. 2 is a cross sectional view of the first exemplary embodiment taken along an axis of rotation.

Referring to FIGS. 1 and 2, a tool assembly 20 according to an exemplary embodiment of the invention can include a cutter 42 having a plurality of cutting teeth 50 spaced circumferentially about an axis of rotation A, along a cutting end periphery 46. The cutter 42 can be rotated to shape an internal feature. Alternatively, the cutter 42 can perform a shaping or material-removal operation without being rotated. The work-piece subjected to material removal by the cutter 42 can be formed from metal, plastic, ceramic, wood, or any other material.

The cutter 42 can include a body 84 extending away from the cutting end periphery 46 along the axis of rotation A. The exemplary cutter 42 is generally conically-shaped or cup-like and extends along the axis A between a cutting end 44 having the cutting end periphery 46 and a placement end 48. The plurality of cutting teeth 50 can extend from the cutting end 44 along the axis of rotation A and can be spaced about the cutting end periphery 46. The cutter 42 can also include an inner cavity 52 that is defined by an inner cutter surface 54. The surface 54 can be a conical shape that extends from the cutting end 44 to a bottom wall 56. The bottom wall 56 can extend radially inward to a central aperture or opening 58.

The tool assembly 20 can also include a cap 62. The cap 62 can have a body portion 68 received in the cavity 52 of the cutter 42. The body portion 68 can have a cylindrically-shaped body periphery 70. The body periphery 70 can be spaced radially inward from the inner cutter surface 54 to define a chamber 72 open at the cutting end 44. The exemplary inner cutter surface 54 surrounds the chamber 72 as shown in FIG. 1. The body periphery 70 and the surface 54 can diverge away from one another along the axis A such that a cross-sectional area of the chamber 72 is larger near the cutting end periphery 46. This feature of the exemplary embodiment is not a requirement of the broader invention.

The cap 62 can also include a dispersion disk 80 that extends radially from the body portion 68 to a disk periphery 86 (shown only in FIG. 1) having a diameter $d_d$ (shown only in FIG. 2). The disk periphery 86 can be disposed radially outward of the inner cutter surface 54 of the cutter 42 and radially inwardly of the cutting end periphery 46 of the cutter 42. Also, the diameter $d_d$ can be less than a root diameter $d_r$ (shown only in FIG. 2) of the plurality of cutting teeth 50. This can be desirable to achieve a particular discharge pattern for fluid (to be described below) and/or to adjust the discharge coefficient. The dispersion disk 80 is axially spaced from the cutting end 44 of the cutter 42 to define a gap thickness $g_t$ (shown only in FIG. 2) in communication with the chamber 72.

The exemplary tool assembly 20 can also include a passageway 64 indicated generally in the Figures. The passageway 64 directs a flow of fluid to the cutting end periphery 46. The fluid can be coolant in the exemplary embodiment of the invention, but can be other fluids such as air or lubricant in alternative embodiments of the invention. The passageway 64 can be defined at least in a part by the cutter 42 and can extend at least partially along the axis of rotation A.

The exemplary passageway 64 is formed from several different sub-sections: an axial section 63 extending along the axis A through a stem 76 integral with the body portion 68, a plurality of radial sections 66 extending radially away from the axial section 63 toward the body periphery 70 through the body portion 68, and the chamber 72 defined between the body portion 68 and the body 84. In alternative embodiments of the invention, the axial section 63 can a plurality of individual passageways and/or can be spaced from the axis of rotation A. The radial sections 66 can be spaced equally and circumferentially about the body periphery 70. Alternative embodiments of the invention can include a single radial section. The axial section 63 and the plurality of radial sections 66 can be considered a first portion of the passageway 64, internal to the cap 62, and the chamber 72 can be considered a second portion of the passageway 64, external to the cap 62.

The gap thickness $g_t$ can allow for the dispersion of fluid from the chamber 72 over the entire cutting end periphery 46 of the cutter 42. FIG. 1 shows fluid such as coolant 82 in a ring-like shape extending away from the assembly 20 over 360 degrees about the axis A. In operation, pressurized fluid can pass through the axial section 63 along the axis A, through the plurality of radial sections 66 radially away from the axis A, into the chamber 72, and can then be deflected radially outward by the dispersion disk 80 through the gap thickness $g_t$.

Referring again to FIG. 2, in the first exemplary embodiment of the invention, the cutter 42 and the cap 62 can be engaged together and with an arbor 22. The arbor 22 can have an outer cylindrical surface defining an arbor diameter da. The arbor 22 can extend along the axis of rotation A between an attachment end 24 and a tooling end 26. An annular recess 28 can be formed in the tooling end 26, whereby a shoulder 34 is defined to form a reduced-size support portion 30 for supporting the cutter 42. The support portion 30 can be cylindrical about the axis of rotation A, with an outer support surface 32 extending to a support diameter $d_s$ less than the arbor diameter $d_a$. A groove 36 can extend annularly about the axis A, adjacent to the outer support surface 32 of the support portion 30. The groove 36 can be a desirable feature for maintaining a finite radius between the end 48 and the surface 32 while the end 48 is machined flat. The groove 36 accommodates a burr on the shaper tool used for machining the end 48.

During assembly of the parts, the support portion 30 can be inserted through the opening 58 until the placement end 48 of the cutter 42 abutting the shoulder 34. The central opening 58 of the cutter 42 can tightly encircle the outer support surface 32 of the support portion 30 to limit radial movement of the cutter 42 relative to the arbor 22.

The cap 62 can also be assembled to the arbor 22. The arbor 22 can define a bore 38 that extends axially through the arbor 22 along the axis A. The bore 38 can extend through the arbor 22 to permit the flow of coolant through the arbor 22. The bore 38 can include internal threads 40 that extend axially from the tooling end 26. The stem 76 of the cap 62 can include external threads 78. The threads 40, 78 can be in threaded engagement with one another to secure the cap 62 and the arbor 22 together.

In the exemplary embodiment of the invention, a washer 60 can be disposed on the bottom wall 56 of the cutter 42. The washer 60 can extend about the central opening 58 and have a washer thickness $t_w$. The exemplary cap 62 can include an engagement projection 74 that is ring-shaped and extends axially from the body portion 68. The engagement projection 74 can have an outer engagement diameter $d_{oe}$ equal to the diameter of the body periphery 70 and have an inner engagement diameter $d_{ie}$ greater than the support diameter $d_s$ of the support portion 30 of the arbor 22. The projection 74 can press the washer 60 against the arbor 22 as the threads 40, 78 progressively engage one another to seal the tool 42 and arbor 22 relative to one another.

The gap thickness $g_t$ can be proportional to the washer thickness $t_w$ of the washer 60. To increase the gap thickness $g_t$, a washer 60 with an increased washer thickness $t_w$ can be used. To decrease the gap thickness $g_t$, a washer 60 with a decreased washer thickness $t_w$ can be used or no washer 60 may be used. The washer thickness $t_w$ allows for the gap thickness $g_t$ to be adjusted so that flow restriction can be matched to pump capacity or flow rate and/or a maximum pumping pressure. This can result in achieving a desirable balance between flow rate around the cutting end periphery 46 and the velocity of the flow of coolant.

Accordingly, as shown by the first exemplary embodiment, the subject invention can provide an assembly 20 that applies coolant evenly around 360 degrees and at a zero angle to the cutting end periphery 46 of the cutter 42. The dispersion of the coolant around all 360 degrees allows for the entire cutting end periphery 46 to be lubricated and cleaned equally. Also, the dispersion of the coolant at zero degrees relative to the cutting end periphery 46 can increase chip removal efficiency.

Figure 3:
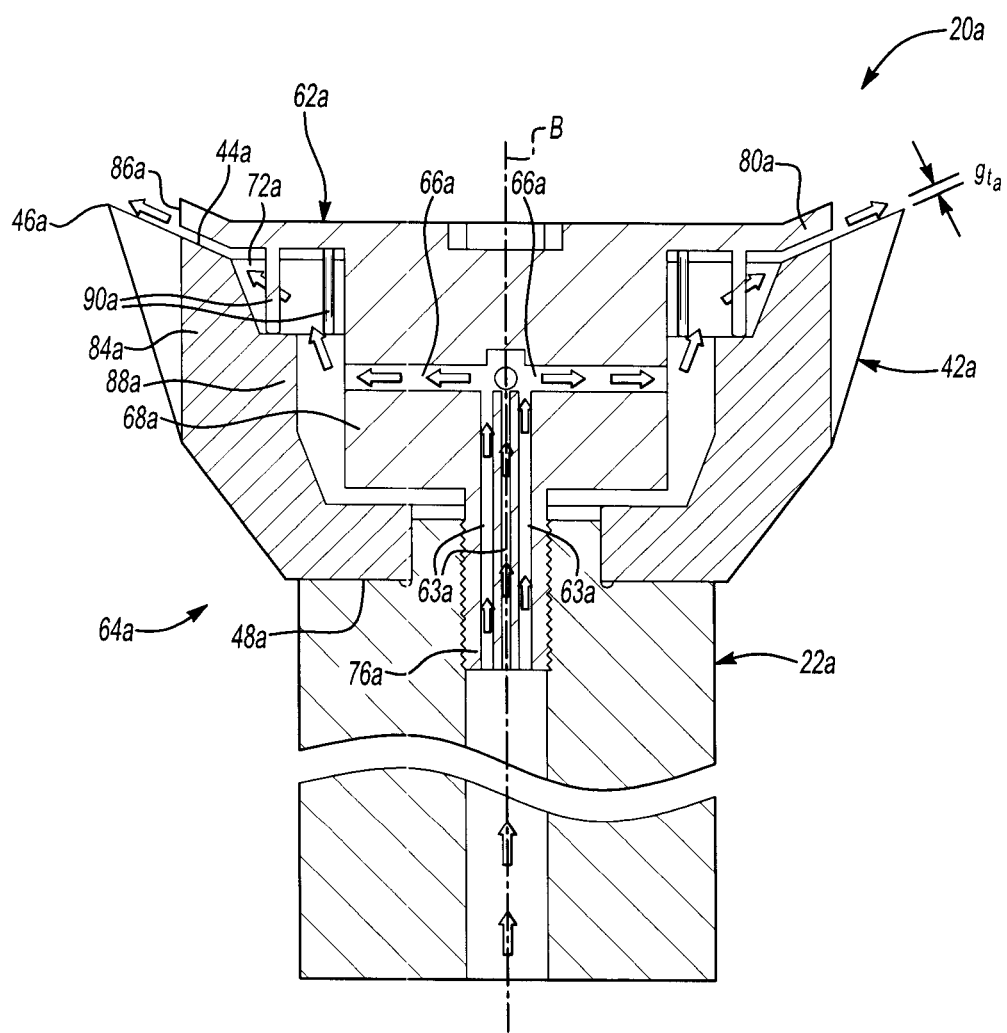
FIG. 3 is a cross sectional view of a second exemplary embodiment of the invention taken along an axis of rotation.

FIG. 3 shows a second embodiment of the invention, different than the first embodiment but within the scope of the broader invention. The second embodiment of the invention is a tool assembly 20a having a cutter 42a and a cap 62a. The exemplary cutter 42a can include a body 84a extending along a centerline or axis of rotation B between a cutting end 44a having a cutting end periphery 46a and a placement end 48a. The exemplary cap 62a can include a dispersion disk 80a, a body portion 68a, and a stem 76a. The exemplary tool assembly 20a can be mounted on an arbor 22a.

The tool assembly 20a can include a passageway 64a (shown generally) operable to direct fluid received from the arbor 22a to a gap thickness $g_{ta}$ defined between the dispersion disk 80a and the cutting end 44a in a 360 degree dispersion pattern. The passageway 64a can include a plurality of axial sections 63a feeding fluid to a plurality of radial sections 66a. The passageway 64a can also include a chamber 72a fed fluid by the plurality of radial sections 66a and defined between the body portion 68a of the cap 62a and the body 84a of the cutter 42a. The fluid can exit the passageway 64a through the gap thickness $g_{ta}$.

In the first exemplary embodiment of the invention, the gap thickness $g_t$ was generated by the placement of the washer 60 between the cutter 42 and the cap 62 (shown in FIGS. 1 and 2). In the second exemplary embodiment of the invention, the gap thickness $g_{ta}$ can be generated by direct cooperation between the cutter 42a and the cap 62a. The exemplary cutter 42a can include a step 88a in the chamber 72a. The step 88a can encircle the axis B and project radially toward the axis B from the body 84a. The step 88a can be spaced from the body 68a such that fluid moving through the passageway 64a can pass around the step 88a to reach the gap thickness $g_{ta}$.

The exemplary cap 62a can include a plurality of posts or columns 90a in the chamber 72a projecting along the axis B from the dispersion disk 80a. The columns 90a can be evenly spaced around the axis B. During construction of the tool assembly 20a, the stem 76a can be engaged with the arbor 22a with threads until the columns 90a engage the step 88a. The cooperation between the columns 90a and the step 88a can ensure that the gap thickness $g_{ta}$ is defined and can also ensure that the placement end 48a of the cutter 42a is pressed against the arbor 22a. The chamber 72a is configured such that fluid can pool downstream of the columns 90a to prevent uneven dispersion of fluid. However, alternative embodiments can include a structural arrangement in which direct engagement between a cap and a cutter occurs substantially at the cutting periphery or at the disk periphery, such that fluid may not pool downstream of the structures defining the gap thickness.

In the second embodiment of the invention, the cutting end 44a extends both radially and axially relative to the axis B, in contrast to the cutting end 44 of the first embodiment (shown in FIGS. 1 and 2) which extends only radially. FIG. 3 also shows that the dispersion disk 80a is formed to correspond to the orientation of the cutting end 44a, the periphery 86a of the dispersion 80a being upturned in the second exemplary embodiment of the invention.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A tool assembly for removing material from a workpiece and comprising:
   a cutter having a plurality of cutting teeth spaced circumferentially about an axis of rotation along a cutting end periphery, said cutter also having a body extending away from said cutting end periphery along said axis of rotation;
   a passageway for directing a flow of coolant to said cutting end periphery, said passageway defined at least in a part by said cutter;
   a cap engaged with said cutter and having a dispersion disk positioned in spaced relation to said cutting end periphery whereby an annular gap is defined between said cutting end periphery and said dispersion disk along said axis of rotation, said gap communicating with said passageway for directing coolant radially outward relative to said axis of rotation, said annular gap being open toward said plurality of teeth and also being open in a direction of originating at said axis of rotation and extending away from said axis of rotation between said plurality of teeth; and
   a washer disposed between said cap and said cutter along said axis of rotation, wherein a size of said gap is at least partially the result of a thickness of said washer.

2. The tool assembly of claim 1 wherein said dispersion disk is further defined as extending radially outward from said axis of rotation to a disk diameter, said disk diameter being smaller than a diameter of said cutting end periphery.

3. The tool assembly of claim 2 wherein said disk diameter is further defined as smaller than a root diameter of said plurality of cutting teeth.

4. The tool assembly of claim 1 wherein:
   said body of said cutter includes an inner cavity defined by an inner cutter surface spaced radially inward from said plurality of cutting teeth; and
   said cap includes a body portion extending from said dispersion disk along said axis of rotation, said body portion having a body periphery received in said inner cavity, wherein a chamber is defined between said inner cutter surface and said body periphery and wherein said chamber is a portion of said passageway and wherein said inner cutter surface is conically-shaped in said chamber.

5. The tool assembly of claim 4 wherein said inner cutter surface and said body periphery diverge away from one another along said axis of rotation.

6. The tool assembly of claim 1 wherein:
   said body of said cutter includes an inner cavity defined by an inner cutter surface spaced radially inward from said plurality of cutting teeth and a step projecting into said cavity; and
   said cap includes a plurality of posts extending from said dispersion disk along said axis of rotation, said posts engaging said step and limiting movement of said cap and said cutter relative to one another to define said gap.

7. The tool assembly of claim 1 wherein said passageway is further defined as being defined at least in part by said cap.

8. The tool assembly of claim 1 wherein said cap and said cutter are removably engaged to one another.

9. The tool assembly of claim 1 wherein said annular gap is open in substantially every direction originating at said axis of rotation and extending away from said axis of rotation between said plurality of teeth.

10. A tool assembly for cutting metal comprising:
    a cutter being generally cup-shaped and extending along an axis of rotation from a cutting end with a cutting end periphery to a placement end opposite said cutting end, said cutter having a plurality of cutting teeth spaced circumferentially about said axis of rotation at said cutting end periphery and also having an inner cavity defined by an inner cutter surface;
    a cap having a body portion with a body periphery received in said inner cavity of said cutter and having a dispersion disk extending radially outward relative to said body periphery to a disk periphery having a disk diameter, said dispersion disk positioned along said axis of rotation in axially spaced relation to said cutting end periphery whereby an annular gap is defined; and
    a passageway for directing a flow of coolant to said annular gap including a first portion formed on all sides by said cap and a second portion extending between said cap and said cutter; and
    a washer disposed between said cutter and said cap and having a thickness resulting in at least a portion of a size of said gap along said axis.

11. The tool assembly of claim 10 wherein said first portion of said passageway includes at least one axial section extending along said axis of rotation and a plurality of a radial sections extending radially away from said central section toward said boy periphery.

12. The tool assembly of claim 10 further comprising:
    an arbor extending along said axis of rotation from a tooling end engaging said cutter and said cap to an attachment end, said tooling end having a smaller diameter than said attachment end and received in a central opening of said cutter, said arbor having a bore communicating with said passageway.

13. The tool assembly of claim 12 wherein:
    said cap further comprises a threaded stem extending from said body portion opposite said dispersion disk along said axis of rotation; and
    said bore of said arbor further comprises a threaded portion operable to engage said threaded stem.

14. The tool assembly of claim 13 wherein said cap further comprises an annular projection having an inside diameter greater than an inside diameter of said washer.

15. A tool assembly for removing material from a workpiece and comprising:
    a cutter having a plurality of cutting teeth spaced circumferentially about an axis of rotation along a cutting end periphery, said cutter also having a body extending away from said cutting end periphery along said axis of rotation;
    a passageway for directing a flow of coolant to said cutting end periphery, said passageway defined at least in a part by said cutter;
    a cap engaged with said cutter and having a dispersion disk positioned in spaced relation to said cutting end periphery whereby an annular gap is defined between said cutting end periphery and said dispersion disk along said axis of rotation, said gap communicating with said passageway for directing coolant radially outward relative to said axis of rotation, said annular gap being open toward said plurality of teeth and also being open in a direction of originating at said axis of rotation and extending away from said axis of rotation between said plurality of teeth;
    wherein said body of said cutter includes an inner cavity defined by an inner cutter surface spaced radially inward from said plurality of cutting teeth; and wherein said cap includes a body portion extending from said dispersion disk along said axis of rotation, said body portion having a body periphery received in said inner cavity, wherein a chamber is defined between said inner cutter surface and said body periphery and wherein said chamber is a portion of said passageway and wherein said inner cutter surface is conically-shaped in said chamber.

* * * * *

UNITED STATES PATENT AND TRADEMARK OFFICE
CERTIFICATE OF CORRECTION

PATENT NO.       : 8,858,125 B2                                           Page 1 of 1
APPLICATION NO.  : 12/041904
DATED            : October 14, 2014
INVENTOR(S)      : Pilkington It is certified that error appears in the above-identified patent and that said Letters Patent is hereby corrected as shown below:

In the claims,

Col. 6, line 27 (Claim 11) replace the word "boy" with the word "body" so that the claim reads:

"...extending radially away from said central section toward said body periphery."

Signed and Sealed this
Fifteenth Day of December, 2015

Michelle K. Lee
*Director of the United States Patent and Trademark Office*